June 14, 1960 L. G. SIMJIAN 2,941,187

APPARATUS AND METHOD FOR DETERMINING THE CHARACTER OF A DOCUMENT

Filed Dec. 30, 1957 2 Sheets-Sheet 1

INVENTOR.
LUTHER G. SIMJIAN
BY
Ervin B. Steinberg
AGENT.

June 14, 1960

L. G. SIMJIAN

APPARATUS AND METHOD FOR DETERMINING THE CHARACTER OF A DOCUMENT 2,941,187

Filed Dec. 30, 1957

2 Sheets-Sheet 2

INVENTOR.
LUTHER J. SIMJIAN
BY
Ervin B. Steinberg
AGENT.

2,941,187

APPARATUS AND METHOD FOR DETERMINING THE CHARACTER OF A DOCUMENT

Luther G. Simjian, Laurel Lane, Greenwich, Conn.

Filed Dec. 30, 1957, Ser. No. 706,198
9 Claims. (Cl. 340—149)

This invention is related generally to means for analyzing documents and more particularly refers to an apparatus and means for determining the character of a document by investigating certain inherent properties which distinguish one document from those of another, yet similar, document. The invention specifically refers to means for determining the character of a document by investigating pre-established patterns.

In the past, many attempts have been made to devise automatic means for determining the genuineness of a document, for instance of a specific paper currency document. Devices of this type are rather complex and cumbersome and involve the comparison of one paper document with a master or standard document. Typical embodiments include line by line scanning, optical alignment, matching of selected areas, etc. In this manner, the prior art devices constitute primarily verification apparatus for one type of document and cause rejection of all documents which do not fall within the limits of the master document or within otherwise acceptable limits.

The instant invention concerns not only a novel, simple and inexpensive means for establishing the character of a document but permits also recognition of a plurality of different documents by automatic means. Such a device is useful primarily in conjunction with automatic vending machines or depository apparatus where paper bills of varying denomination may be employed. The instant device will check the genuineness of a document, but moreover, will recognize and establish the identity of a document from a plurality of possibilities, for instance the character or denomination of a paper bill. In this manner, automatic vending or depository machines are rendered much more flexible. Furthermore, the instant device will be applicable for sorting purposes and many other uses in automatic machines.

In order to carry out my invention, I have discovered that different documents, that is, documents of different denomination for instance, have graphic representations which are substantially uniform within the same denomination, but differ widely for different denominations. By selecting a plurality of discrete areas and measuring the light absorption on pre-established areas, depending upon the denomination, different readings are obtained. When comparing a set of readings of one document with that from another set, or with a predetermined value, the character of the document or the value of the denomination can accurately be ascertained.

Documents, especially paper bills, are subject to extensive handling and therefore carry varying amounts of dirt and smudge. By measuring the difference of light absorption on the selected areas rather than the total or absolute amount of light absorption, the degree of contamination, does not form an element of measurement. In this manner accuracy of identification and recognition is maintained as the vast majority of documents shows a substantially equal amount of wear over the entire surface.

In its simplest embodiment the instant invention measures the light absorption on two preselected areas of a document and produces a signal responsive to the difference of the absorption at these two areas. Depending upon the category or denomination of the document, this difference signal will vary widely in view of the varying graphic representations on one or both sides of the document. The difference signal obtained is then used for operation of a control circuit wherein the signal is compared with a predetermined value or with a plurality of predetermined signals to cause actuation of electromechanical control means.

One of the objects of this invention therefore is the provision of a new and improved method and apparatus for determining the character of a document.

Another object of this invention is the provision of a method and apparatus adapted for recognizing and sorting documents.

Another object of this invention is the provision of an apparatus which will recognize the character of a plurality of documents and which will reject documents not falling within the category of the pre-selected documents.

A further object of this invention is the provision of means for illuminating selected areas on a document and measuring the difference of light absorption between the selected areas, this difference indicating the character of the document.

A further object of this invention is the provision of a document recognizing and sorting device which is adapted for use in connection with vending and depository machines.

Another and further object of this invention is the provision of a method and apparatus for comparing the light absorption between a plurality of selected areas on different documents and establishing the character of the document by comparing the light absorption with a standard or a pre-established value.

Other and further objects of this invention will be apparent by reference to the following description taken in conjunction with the accompanying figures in which.

Figure 1:
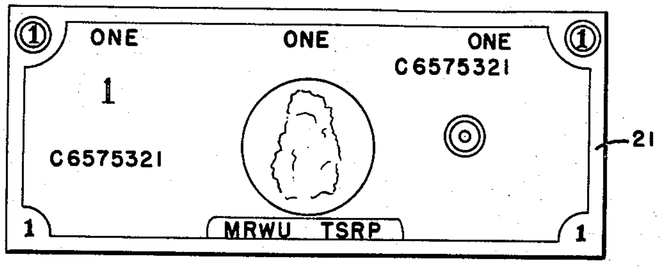
Figure 1 is a representation of a typical document.

Referring now to the figures and Figure 1 in particular, a typical document 21, such as a one dollar bill is illustrated. It will be clearly understood however that the invention is not restricted to establishing the character of paper money, but that other documents for instance, stock certificates, traveler checks, and many other documents may be analyzed in the manner described hereafter without deviating from the broad principle and scope of the invention. It is well known that the graphic illustrations and representations on different denominations differ widely. For instance, the one dollar bill on its front side shows a portrait of George Washington, the picture facing toward the right, the five dollar bill a portrait of Abraham Lincoln, the picture facing toward the right, and a ten dollar bill carrying the portrait of Alexander Hamilton, the portrait facing toward the left side; conversely the one dollar bill on its reverse side carries two circular seals and in large letters the notation "ONE," whereas the five dollar bill carries a pictorial illustration of the Lincoln Memorial and the ten dollar bill a representation of the U.S. Treasury Building. These different pictorial representations cause distinct differences in the light, shaded and/or dark areas on a document, particularly when analyzing the same areas on different documents, that is areas which are fixed with respect to the center or outer margin of the bill. By analyzing the same areas on different types of bills and measuring the light absorption, specifically the differences of light absorption between two fixed areas, a value is obtained which is indicative of the character or denomination of the document.

Figure 2:
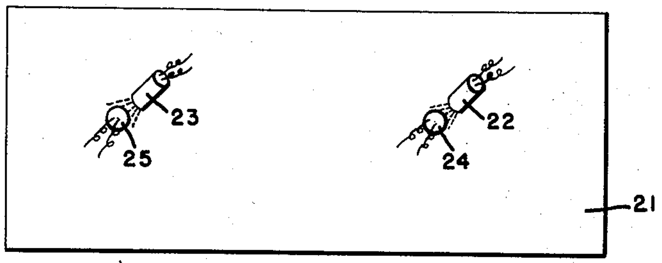
Figure 2 is a plan view of a typical document showing the arrangement of photoelectric means on preselected areas.

Figure 2 is a plan view of a document such as is illustrated in Figure 1 with a set of small incandescent lamps 22 and 23 illuminating two discrete areas on the document. Two photocells 24 and 25 are used to measure the light reflected from these areas. The photoelectric means employed are preferably cadmium sulfide photoelectric cells which are small tubular tubes of 1/16 or 1/8 inch diameter and which are commercially available from a number of electronic tube manufacturers.

Figure 3:
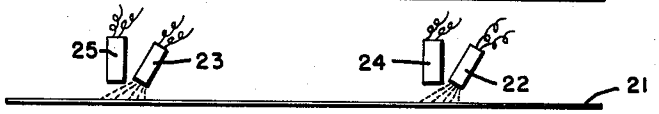
Figure 3 is an elevational view of the arrangement shown in Figure 2.

Figure 3 shows a vertical view of the document 21 with illuminating means 22 and 23 illuminating two distinct areas and photoelectric means 24 and 25 receiving the light reflected, that is the light incident upon the document area minus light absorption by the surface of the document.

Figure 4:
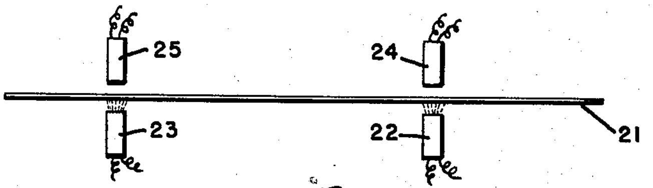
Figure 4 is a variation of the arrangement shown in Figures 2 and 3.

Figure 4 shows a variation of the arrangement illustrated in Figures 2 and 3 wherein the document is disposed between the light means 22 and 23 and the photoelectric means 24 and 25 respectively, so that the photoelectric means obtain a value indicative of light transmission at the preselected areas. It will be apparent that a combination of Figures 3 and 4 may be used, that is one photocell measuring light reflection and another photocell measuring light transmission.

Figure 5:
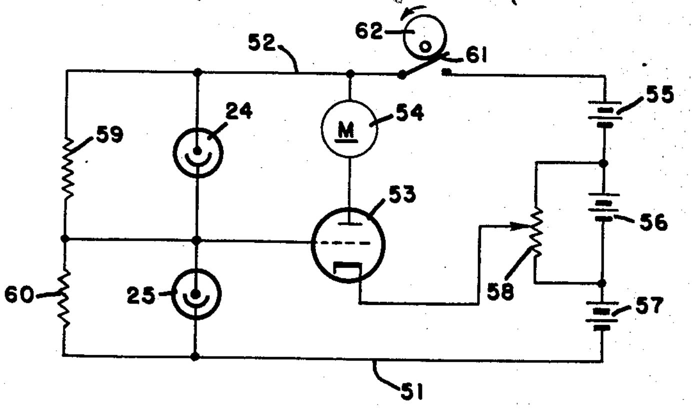
Figure 5 is a typical electronic circuit which may be used for the instant apparatus.

Figure 5 shows a schematic diagram of an electronic circuit which may be employed to carry out the invention. The circuit shows the two photoelectric means 24 and 25 connected across a set of conductors 51 and 52. The mid-point between the photoelectric means is connected to the control grid of an electronic amplifier tube 53, the anode of which is connected in series with a meter 54. Sources of direct current potential 55, 56 and 57 provide the necessary voltages for the circuit. The cathode of tube 53 is connected to a resistor 58 which serves to adjust the bias. Resistors 59 and 60, connected across photoelectric cells 24 and 25 respectively, serve to load the photoelectric means so as to stablize the circuit. This circuit is of conventional type and is explained in detail in the book entitled "Fundamentals of Industrial Electronic Circuits" by W. Richter, published by McGraw-Hill Book Company, 1947, New York, New York, pages 508 to 511.

The circuit is activated by closing switch 61 which may be operated by a cam means 62. When the light falling upon photoelectric means 24 and 25 is of the same value, meter 54 will be at zero. When however there is a difference between the light incident upon photoelectric means 24 and 25, current flows through the meter so that the reading on meter 54 is indicative of the character of the document.

Figure 6:
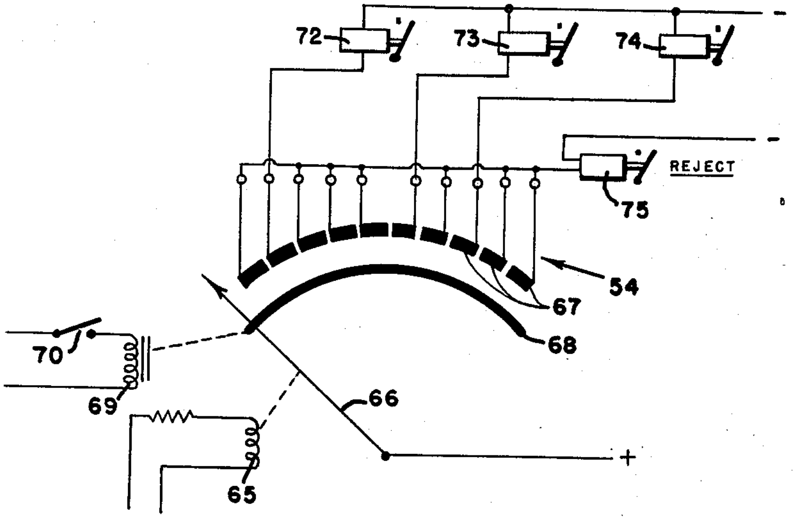
Figure 6 shows certain details of the metering element used in conjunction with Figure 5.

In order to convert the visual information to automatic means, it will be advantageous to employ a circuit closing meter as shown in Figure 6. The meter represented is a so-called multi-contact meter relay which incorporates a D'Arsonval meter movement with a printed circuit scale replacing the normal dial, electrical contacts on pointer, and a device for intermittently clamping the pointer to the scale to determine the level of the signal on the meter movement. The meter incorporates a standard signal coil 65 which positions a pointer 66 responsive to the signal on coil 65. The standard dial on the meter is replaced by a plurality of segments 67, each of which forms a distinct contact. It will be obvious that the scale may be divided into any number of segments depending upon the length of the scale, physical limitations, etc. Standard meters may be purchased with ten and thirty segments per scale length. Furthermore, the instrument incorporates a pusher bar 68 which is mounted in front of the pointer 66 and which is operated by a clamping coil 69. This coil is energized by switch 70 whenever a read out is desired.

Assuming that the signal coil 65 receives a signal responsive to the light difference between photoelectric means 24 and 25 (Figure 5), pointer 66 will move clockwise to a certain value and when closing switch 70, clamping coil 69 becomes energized and as a result thereof depresses pusher bar 68 so that pointer 66 will establish contact with one of the segments 67 of the dial. The operation of this meter is described also in the Data Sheet number 4A, dated March 1957, entitled "LIAD Multi-Contact Meter-Relay," available from the Assembly Products, Inc., Wilson Mills Road, Chesterland, Ohio. Similar instruments have been used for many years in the high vacuum technique for starting vacuum pumps in unattented locations whenever the pressure falls below an acceptable limit.

Preselected segments are connected in series with relays, for instance relay 72 being connected to the second contact from the left, relay coil 73 being connected to the sixth contact and relay coil 74 being connected to the eighth contact of the meter. All other contacts are connected in parallel and connected in series with another electromagnetic relay coil 75. When a document is analyzed and pointer 66 comes to rest on the second segment from the left, as an example, an indication for a one dollar bill may be apparent whereas when the sixth segment is reached a five dollar bill may be indicated or when the eighth segment is reached a ten dollar bill is indicated, while for all other instances a reject relay 75 is energized to indicate that none of the preset values has been reached and that the document analyzed does not fall within the preselected values. In this manner, a plurality of documents may be analyzed and compared with preselected values and acceptance or rejection is obtained depending upon the range selected. Obviously by dividing the scale into thirty or more divisions, several segments may be connected together in order to set or vary the limits of acceptance or rejection.

Figure 7:
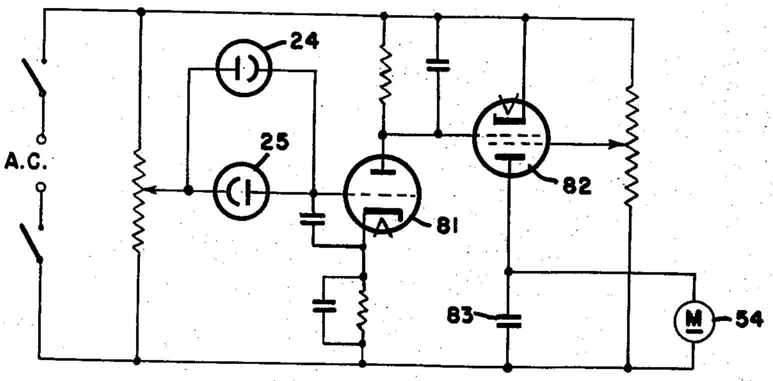
Figure 7 is another electronic circuit which may be used in conjunction with the instant invention.

Another circuit which may be used in conjunction with the foregoing apparatus is shown in Figure 7. The circuit again incorporates two photoelectric means 24 and 25 and two associated electronic tubes 81 and 82 respectively. The indication on meter 54 is responsive to the charge on capacitor 83. As long as equal amounts of light fall upon photoelectric tubes 24 and 25, the charge on capacitor 83 will be zero. For all other conditions there will be an equilibrium voltage on capacitor 83 which deflects the pointer on meter 54. This circuit produces an indication which is proportional to the ratio of the illumination, or in other words, an indication of the deviation from unity. The circuit is described in detail on page 511 of the book on Industrial Electronic Circuits referenced above.

It will be apparent that many other electrical and/or electronic circuits may be used in a similar manner without deviating from the principle of measuring the difference of light between a plurality of preselected areas of the document. The quantity of photocells and location thereof may be adjusted to suit the individual conditions of the document. Moreover, instead of the meter 54, many relay circuits, including digital counting circuits or matrix type arrangements may be devised in order to obtain a reading of the light difference and then comparing this difference with a predetermined value to establish identification, acceptance or rejection of the document.

When the photoelectric sensing means are stationary with respect to the documents, it will be apparent that the document must become aligned with respect to the photoelectric means in order that the photocells scan always the same point of the pre-established pattern. Such alignment may be made manually or by means of electrical or electronic sensing means, for instance margin alignment as is well known in the graphic art particularly in connection with high speed rotary printing presses. In this manner, the document becomes aligned against a reference, for instance the upper left margin corner or some other ready reference which may include or exclude marginal spacing depending upon whether the marginal spaces are uniform or varying. Moreover, in an alternate design, a person desiring to insert paper money for instance, into a vending machine or into a depository machine, may be required to align the document prior to the apparatus being energized. Such an alignment may comprise optical reference markings projected on a reference screen and hand controls to achieve this alignment in a manner similar to optical comparators. Alternately, envelopes may be used which have one or more discrete apertures. Alignment of the document within the envelope is accomplished by positioning the document with reference to one aperture. In this manner the document, when inserted in the envelope, will automatically be aligned and the machine will advance the envelope against a fixed reference line. Instead of envelopes with apertures, transparent envelopes may be used which are equipped with reference or guide markings. Many other ways of alignment may be devised without deviating from the principle of establishing the identity and character of a document as disclosed hereinbefore.

It will be apparent that the method and apparatus described will be useful for documents which have a prearranged pattern and wherein this pattern is uniform within one category of documents but differs with respect to the pattern of documents falling within another category. The prearranged pattern may comprise printed information, paper or material stock itself, water marks, or other identifying characteristics.

While there have been described certain illustrations and embodiments of the foregoing invention, it will be apparent to those skilled in the art that many other variations and changes may be made therein without deviating from the broad principle disclosed which shall be limited only by the scope of the appended claims.

What is claimed is:

1. An apparatus for determining the character of a document comprising: a plurality of light responsive means receiving light from selected areas of a single document under investigation; circuit means connected to said light responsive means for receiving signals responsive to the intensity of the light incident upon said light responsive means from said areas on said single document; said circuit means producing a signal responsive to the difference of light intensity on said light responsive means, and control means connected to receive said signal and become actuated thereby when said signal is of a predetermined intensity.

2. An apparatus for determining the character of a document comprising a plurality of sensing stations, each comprising: illuminating means and light responsive means for receiving light from a different area on a single document which is disposed at said sensing stations; said light responsive means connected to produce a signal responsive to the value of light striking the plurality of light responsive means, and circuit means connected to receive the signal responsive to the value of light for causing selective circuit actuation in response to the intensity of said signal.

3. An apparatus for determining the character of a document comprising: a plurality of light responsive means receiving light from selected areas of a single document under investigation; circuit means connected to said light responsive means for receiving signals responsive to the intensity of the light incident upon said light responsive means from the selected areas on said single document; said circuit means producing a signal responsive to the ratio of light intensity on said light responsive means, and control means connected to receive said signal and become actuated thereby when said signal is of a predetermined intensity.

4. An apparatus for determining the character of a document comprising: a plurality of light responsive means receiving light from selected areas of a single document under investigation; circuit means connected to said light responsive means for receiving signals responsive to the intensity of the light incident upon said light responsive means from the selected areas on said single document; said circuit means producing a signal responsive to the sum of light intensity on said light responsive means, and control means connected to receive said signal and become actuated thereby when said signal is of a predetermined intensity.

5. An apparatus for determining the character of a document comprising: a plurality of sensing stations, each station including means for illuminating the document and light responsive means; said light responsive means receiving light from the illuminated areas on said single document; electrical circuit means connected to receive from said light responsive means electrical signals which are responsive to the value of light striking the light responsive means; selective circuit means connected for actuation by said light responsive signals whereby the extent of actuation of said selective circuit means is indicative of the character of the document.

6. An apparatus for determining the character of a document as set forth in claim 5 wherein said light responsive means receive light reflected from said document.

7. An apparatus for determining the character of a document as set forth in claim 5 wherein said light responsive means receive light transmitted through said document.

8. An apparatus for determining the character of a document as set forth in claim 5 wherein at least one light responsive means receives light reflected from said document and another light responsive means receives light transmitted through said document.

9. An apparatus for determining the character of a document as set forth in claim 5 wherein said light responsive means comprise photoelectric means.

References Cited in the file of this patent

UNITED STATES PATENTS

| | | |
|---|---|---|
| 1,294,741 | Winkley | Feb. 18, 1919 |
| 2,131,911 | Ayres | Oct. 4, 1938 |
| 2,679,636 | Hillyer | May 25, 1954 |
| 2,899,857 | Rockafellow | Aug. 18, 1959 |